May 5, 1970 W. C. PIERCE, JR 3,510,676
PULSED POWER SUPPLY

Filed May 22, 1968

INVENTOR
WILLIS C. PIERCE, JR.
BY
Larry R. Cassett
ATTORNEY

May 5, 1970

W. C. PIERCE, JR 3,510,676

PULSED POWER SUPPLY

Filed May 22, 1968

INVENTOR
WILLIS C. PIERCE, JR.

BY Larry R. Cassett

ATTORNEY

May 5, 1970   W. C. PIERCE, JR   3,510,676
PULSED POWER SUPPLY

Filed May 22, 1968   5 Sheets-Sheet 5

INVENTOR
WILLIS C. PIERCE, JR.
BY
Larry R. Cassett
ATTORNEY

# United States Patent Office 3,510,676
Patented May 5, 1970

3,510,676
PULSED POWER SUPPLY
Willis C. Pierce, Jr., Murray Hill, N.J., assignor to Air Reduction Company, Incorporated, New York, N.Y., a corporation of New York
Filed May 22, 1968, Ser. No. 731,045
Int. Cl. H03k 3/335
U.S. Cl. 307—108               11 Claims

ABSTRACT OF THE DISCLOSURE

Pulses of power, regulated as to frequency and duty cycle, are passed from a power supply source to an electric welding arc through a first controlled rectifier acting as a switch. Second and third controlled rectifiers are used in a timing system for starting and stopping conduction through the first rectifier. A novel multivibrator, linearly adjustable as to frequency and duty cycle independently, predetermines the necessary time intervals. At the end of a first time interval after the start of a power pulse, the second rectifier is fired in a circuit which applies a capacitor charge to the first rectifier in such polarity as to back-bias the first rectifier. The capacitor, discharging through an oscillatory circuit including a welding inductor, the arc and power source, finally becomes charged in reverse polarity in the process of turning off the first rectifier, thereby opening the arc circuit and ending the power pulse. The capacitor, reversed in charge, back-biases the second rectifier, turning it off. The third rectifier, in series in an oscillatory circuit comprising an inductor, a resistor, and the capacitor, is fired at the end of a second time interval, to permit a half-cycle of oscillation, thereby restoring the capacitor to its original charge and polarity, and turning off the third rectifier. Any excess charge is dissipated in the resistor while the capacitor is re-charging. At the next firing of the first rectifier the cycle starts again.

FIELD OF THE INVENTION

The invention relates to electric power supply sources for supplying power in pulses to a load, for example, a pulsed power supply for electric arc welding. More particularly, the invention relates to means and method for switching a controlled rectifier, for example a silicon controlled rectifier, when it is connected between a direct current source and a load.

BACKGROUND OF THE INVENTION

Various means have been proposed and used for feeding pulses of power from a power source to a load, including arrangements designed specifically for use in electric welding systems.

In one such arrangement, a saturable transformer with appropriate rectifiers is used as a switching device between an alternating current source and an electric welding arc. The degree of saturation in the core of the transformer is controlled by means of a direct current in a control winding coupled to the core. A sufficiently large control current causes the core to saturate, thereby reducing the impedance of a power winding on the same core to a relatively negligible value, and making the power winding act like a closed switch between the power source and the load. A reduction of the control current to a comparatively low value desaturates the core, thereby increasing the impedance of the power winding to a relatively large value, and making the power winding act like an open switch.

In another arrangement, silicon controlled rectifiers are used as switching devices between a direct current power source and an electric welding arc. As a switching device, it is characteristic of the silicon controlled rectifier that the rectifier can be made conductive by impressing a positive potential upon the control electrode of the rectifier. Once made conductive, the rectifier remains in that state irrespective of any further change or even a reversal of the potential on the control electrode. To make the rectifier non-conductive, it is necessary to remove the driving potential that is producing the current through the rectifier, or at least to reduce the driving potential below a certain threshold value. For this purpose a back bias is applied between the anode and cathode of the rectifier. In the arrangement now being described, four silicon controlled rectifiers are arranged in a bridge circuit and auto-transformers are included in the bridge so that when two of the rectifiers are made conductive the auto-transformers generate back electromotive forces in the proper polarities to back bias the other two rectifiers.

A solid state relaxation type oscillator has been used for timing intervals between the instants for firing silicon controlled rectifiers in a pulsed power supply system, with provision for adjusting independently the frequency of oscillations and the duty cycle, the latter being the proportionate dwell time of the oscillator in the on and off condition, respectively. The controls provided for this purpose, however, have not been linear, in that equal changes in the control setting do not result in equal changes in frequency or duty cycle as the case may be.

SUMMARY OF THE INVENTION

A pulsating direct current is supplied to a load from a direct current power source by periodically connecting and disconnecting the source, using as a switch a gated rectifier of a type requiring a back bias upon the anode-cathode path thereof for blocking current therethrough, for example, a silicon controlled rectifier. To open the switch, by turning off the controlled rectifier, at the end of a power pulse, a pre-charged capacitor is connected across the anode and cathode of the rectifier with the charge in the polarity necessary to back bias the rectifier, and allowing the capacitor to discharge its forward current inhibiting charge through a first less than critically damped oscillatory circuit comprising the capacitor, a series inductor, the power source and the load. The capacitor is connected across the rectifier at the proper instant by firing a second silicon controlled rectifier in series with the capacitor. The discharge of the capacitor continues until the energy of the charge, except for loss by dissipation, is transferred to the inductor, whereupon the inductor discharges, re-charging the capacitor in the opposite polarity with respect to the original charge on the capacitor. The capacitor, reversed in charge, back-biases the second rectifier, turning it off. A third controlled rectifier, in series with a second less than critically damped oscillatory circuit, is then fired to permit a half-cycle of oscillation which restores the capacitor to its original polarity and turns off the third rectifier. The circuit is now ready to begin the same cycle over again. Provision is made for employing a minimum of power from the direct current source to make up for dissipation in the oscillatory circuits while maintaining the required voltage across the capacitor.

The time intervals involved in the power pulsing system herein disclosed are determined by means of an improved multivibrator in which the frequency and the duty cycle are independently and linearly adjustable.

DESCRIPTION OF THE PREFERRED EMBODIMENT

Figure 1:
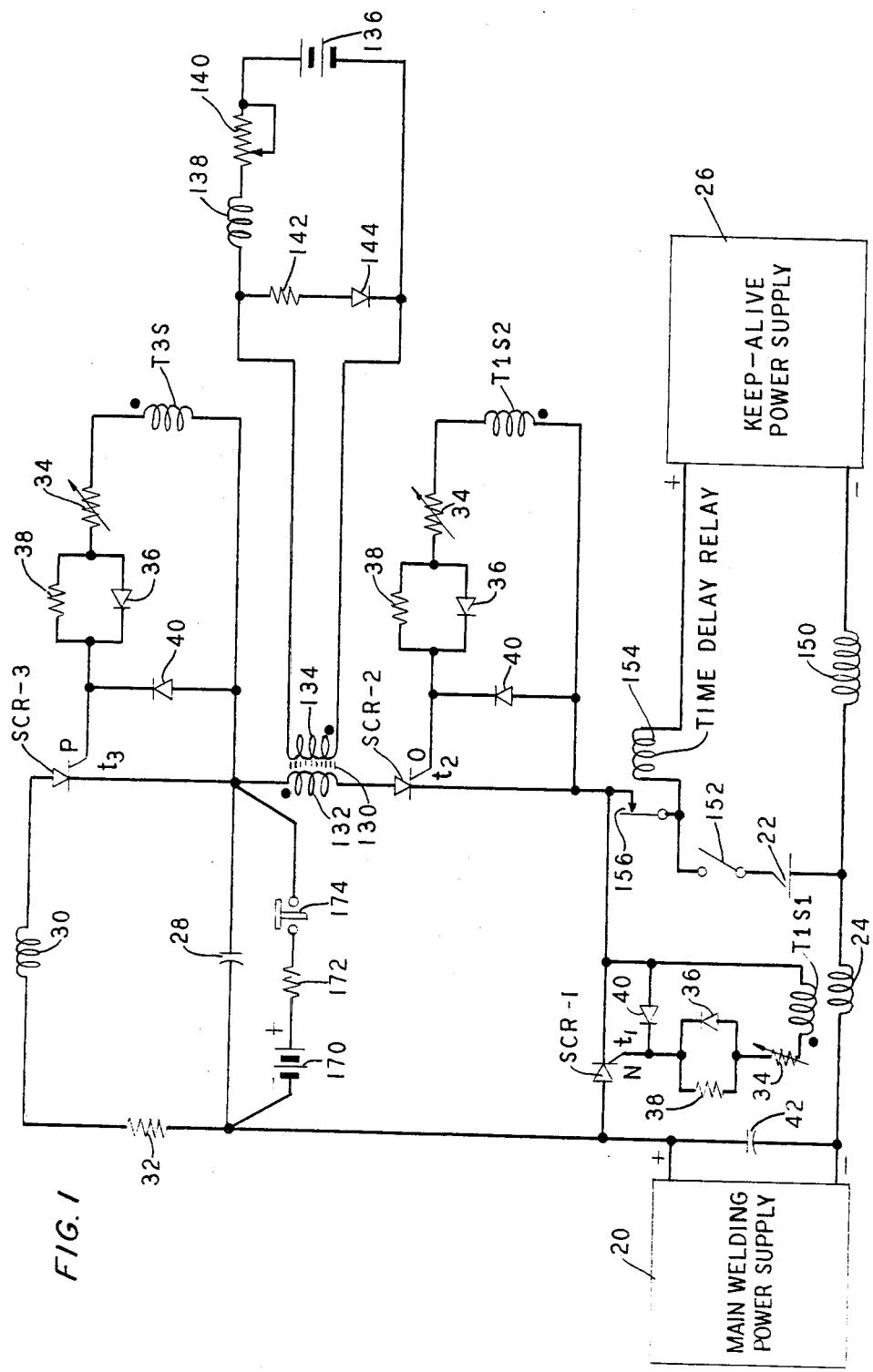
FIG. 1 is a schematic diagram of a pulsed power supply for an electric arc welding system embodying the invention.

Referring to the drawings, FIG. 1 shows a main welding power supply 20 connected to an electric welding arc 22 through a silicon controlled rectifier SCR–1, a contact pair 156, and a welding inductor 24. A keep-alive power supply 26 is connected across the arc 22 in the same polarity with respect to the arc 22 as the main supply 20. For purposes of illustration, the positive polarity of power supply is shown impressed upon the arc electrode and the negative polarity impressed upon the workpiece, although if desired the arc electrode may be negative and the workpiece positive. The direction of forward conductivity of the rectifier SCR–1 is such as to pass current from the main power supply 20 to the arc 22.

Connected in parallel with the rectifier SCR–1 is a capacitor 28 in series with a saturable winding 132 and a second silicon controlled rectifier SCR–2, the polarity of connection of the latter being such as to tend to send current into SCR–1 in the back biasing direction. A first less than critically damped oscillatory circuit is constituted by the capacitor 28, the inductor 24, the rectifier SCR–2, the source 20 and the load provided by the arc 22 as its principal components, with respective impedance values suitably adjusted to provide the desired amount of damping. This oscillatory circuit is operable under the control of the rectifier SCR–2.

Connected in parallel with the capacitor 28 is a series circuit comprising an inductor 30, a resistor 32, and a third silicon controlled rectifier SCR–3. The polarity of connection of the rectifier SCR–3 is such as to tend to send current into the capacitor 28 to establish a back biasing potential for the rectifier SCR–1. A second less than critically damped oscillatory circuit is constituted by the capacitor 28, the inductor 30, the resistor 32 and the rectifier SCR–3 as its principal components, operable under the control of the rectifier SCR–3.

Similar gating or firing circuits are provided for each of the rectifiers SCR–1, SCR–2, and SCR–3, comprising a transformer secondary winding connected between the cathode and the control or gating electrode of the rectifier, in series with an adjustable resistor 34 and a parallel combination of a diode 36 and a resistor 38. A diode 40 is shunted directly across between the cathode and the control electrode to prevent excessive reverse gate voltage on rectifier SCR–2. Diode 36 has its forward conductive direction such as to tend to send current into the control electrode. The transformer secondary winding for controlling SCR–1 is designated T1S1, that for controlling SCR–2 is designated T1S2, and that for controlling SCR–3 is designated T3S. Each of the transformer secondary windings is energized at an appropriate instant $t_1$, $t_2$, or $t_3$. In particular, the rectifier SCR–1 is fired at instant $t_1$ by a pulse from a transformer primary winding T1P1 (FIG. 3) acting through the secondary winding T1S1. The rectifier SCR–2 is fired at instant $t_2$ by a pulse from the winding T1P2 acting through the secondary T1S2. The windings T1P1, T1P2, T1S1 and T1S2 are all coupled to one and the same saturable core, and T1P1 and T1P2 may be combined into a single winding with an intermediate tap or a center tap. The rectifier SCR–3 is fired at instant $t_3$ by a pulse from a transformer primary winding T3P (FIG. 3) acting through the secondary T3S. The primary windings T1P1 and T1P2 in FIG. 3 appear in proximity to circuits for providing the necessary gating pulses and the timing of the intervals between the instants $t_1$, $t_2$, and $t_3$. The cycle of pulses is continually repeated. A capacitor 42 is provided in parallel with the power source 20.

The operation of the system shown in FIG. 1 will now be described in more detail with reference to the set of graphs shown in FIG. 2. The individual graphs making up FIG. 2 each represent the approximate wave form of a voltage or current at a specified place in the system of FIG. 1, as labeled, as a function of time. In each instance, the wave form shown is approximately what has been observed by means of an oscilloscope in studying an actual system that has been successfully operated for the designed purpose.

Figure 2:
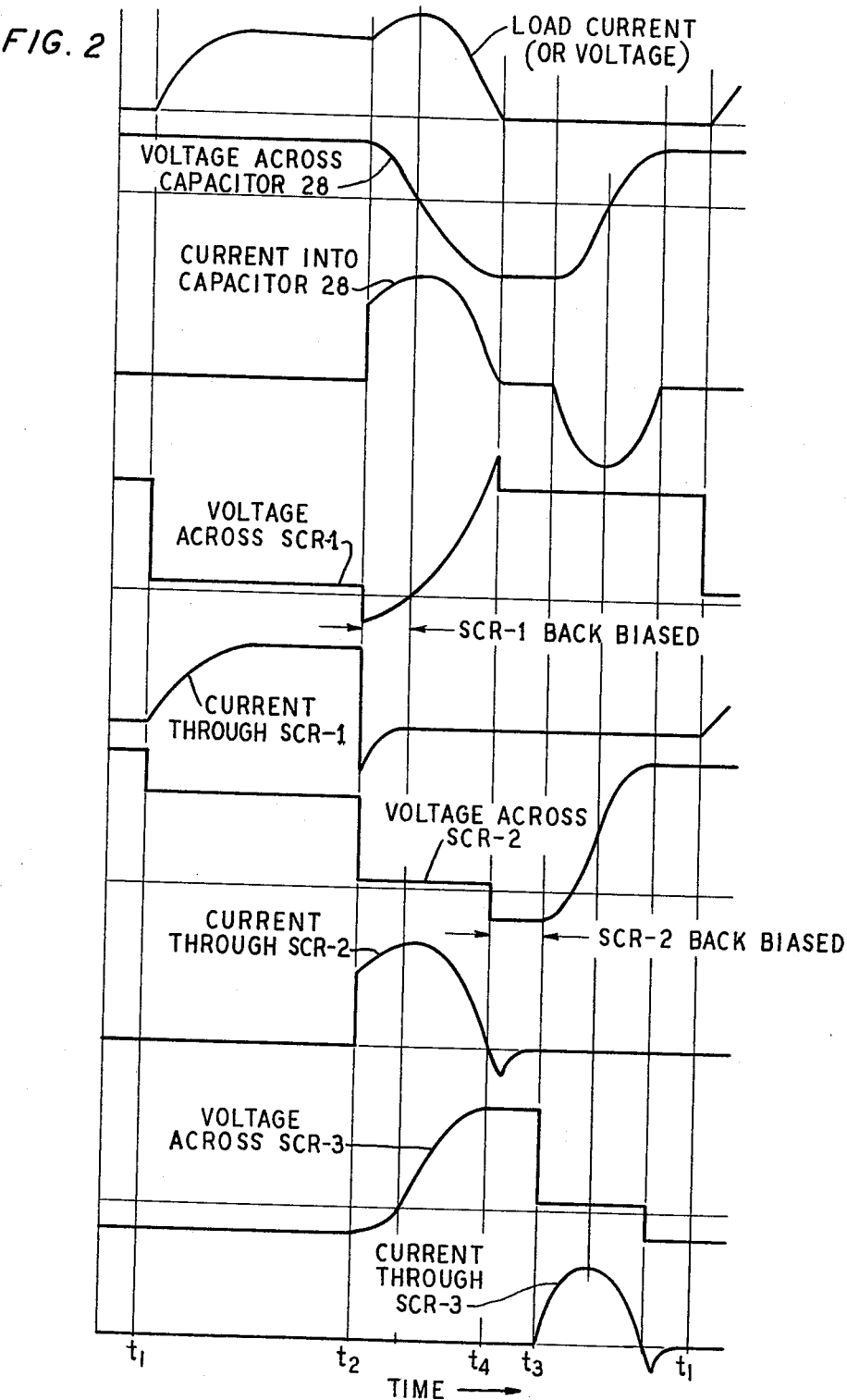
FIG. 2 is a set of graphs representing wave forms at stated points in the system shown in FIG. 1.

At time $t_1$, FIG. 2 shows no current in the load, nor through the capacitor 28, nor through any of the three silicon controlled rectifiers. The capacitor 28 is fully charged in the required initial polarity, that is, negative on the terminal connected to the positive terminal of the main power source 20. The voltage across SCR–1 is substantially the full voltage of the source 20 minus the voltage of the keep-alive power source 26, the latter voltage usually being very much the smaller of the two. The voltage across SCR–1 is in the direction to send forward current through SCR–1 when the latter is fired, that is, constituting a forward bias. There is a voltage across SCR–2 that is the difference of the voltages of the sources 20 and 26 together with the voltage across the capacitor 28 producing a net forward bias to send current through SCR–2 when the latter is fired. The voltage across the capacitor 28 appears across SCR–3 in the direction to back bias SCR–3.

At the instant $t_1$, SCR–1 receives a pulse at its gate electrode and becomes conductive. The voltage across SCR–1 drops almost instantaneously to a substantially negligible value as shown in the graph in FIG. 2, and the current through SCR–1 rises exponentially to attain a substantially constant value. This current is also the load current from the source 20 and constitutes part of a pulse of power to the arc. The voltage across SCR–2 comes down a step, but the charge on the capacitor 28 remains unchanged as long as SCR–2 is not fired.

At the instant $t_2$, a pulse is injected into the gate of SCR–2, causing this rectifier to go into the conductive state and permitting the capacitor 28 to start discharging. The voltage across SCR–2 drops almost instantaneously to a substantially negligible value. The current through SCR–2 rises almost instantaneously to the value of the load current at $t_2$, as the load current switches from SCR–1 into capacitor 28, and then immediately rises further and substantially sinusoidally to the peak value of the load current. Thereafter, it falls substantially sinusoidally to zero at instant $t_4$ (prior in time to instant $t_3$), executing a portion of a half-cycle of an oscillation in the above mentioned first less than critically damped oscillatory circuit comprising capacitor 28 and inductor 24. The period of time from instant $t_2$ that is required for the charge on the capacitor 28 to fall to zero is the period during which SCR–1 is back biased and this time must exceed the time reqired for SCR–1 to recover its forward blocking state.

During the interval from the instant $t_4$ to the instant $t_3$ and for a short time thereafter SCR–2 is back biased. This interval must equal or exceed the time required by SCR–2 to recover its forward blocking state. To make sure, it is desirable to allow the required recovery time between $t_4$ and $t_3$.

Between the instants $t_2$ and $t_4$, the voltage across SCR–3 has reversed and built up to a steady value in such polarity to provide a forward bias to send current through SCR–3 when the latter is fired. At instant $t_3$, SCR–3 is fired and the voltage across SCR–3 falls abruptly to a substantially negligible value. The current through SCR–3 rises substantially sinusoidally to a peak value and then falls to zero, executing a half-cycle of an oscillation in the above mentioned second less than critically damped oscillatory circuit comprising capacitor 28 and inductor 30. The current stops when capacitor 28 becomes fully charged in its original polarity, providing a forward bias on SCR-2 as well as a back bias on SCR-3. At the cessation of current through SCR-3, the voltage across that rectifier falls to its original negative value, due to the back bias on SCR-3.

Now a full cycle has been completed and all the circuits of the system of FIG. 1 are ready to repeat the process, beginning the next cycle at the next application of a pulse at the instant $t_1$ of that cycle.

By a suitable choice of the impedance values of rectifier SCR-1, inductor 24 and capacitor 28, energy stored in the inductor 24 during a power pulse delivered to the load by the direct current source 20 is added to the energy stored in the capacitor 28, so that when the capacitor 28 reverses polarity, the voltage on the capacitor becomes greater than it was before the reversal took place, taking into account dissipation of energy in the resistance of the load. This provides a margin of energy, derived from the direct current source. Then, when the polarity of the charge on the capacitor is again reversed and restored to its original polarity by the half-cycle of oscillation through the rectifier SCR-3, the inductor 30 and the resistor 32, any excess energy is dissipated in the resistor 32. By a suitable choice of the impedance values of rectifier SCR-3, inductor 30 and resistor 32, the dissipation of energy may be precisely controlled so that the voltage across the capacitor 28 returns to the same value at the end of each complete cycle of operation. In this way, I have been able to minimize the amount of energy drawn from the direct current source for maintaining the desired voltage across the capacitor 28 during cyclical operation.

An initial charge in the required polarity must be supplied to the capacitor 28 in some manner before cyclic operation of the system of FIG. 1 can commence. As an illustrative arrangement for supplying the initial charge, there is shown a battery 170, a current-limiting resistor 172 and a push button 174, connected in series with each other across the terminals of the capacitor 28 with the positive terminal of the battery 170 in position to be connected to the side of the capacitor 28 nearer to the anode of SCR-2.

To protect the keep-alive source 26 from the high-powered pulses from the main power source 20, an inductor 150 is included in series with the source 26. The welding contactor 152 is provided for connecting the electric arc 22 to power when starting a welding operation. In order to allow time for current to build up in the inductor 150 and establish keep-alive current in the arc after the contactor 152 makes contact and before pulsed power is applied, a time delay current relay 154 is inserted between the source 26 and the contactor 152. The relay 154, after a time delay, closes a contact pair 156 between the rectifier SCR-1 and the contactor 152. The inductor 150, when carrying its full current, provides a substantially constant current source of keep-alive power, assuring continual operation of the electric arc during all intervals between pulses in which there is no power supplied to the arc from the main power source.

In the drawings, each transformer winding is marked with a dot at one end of the winding in accordance with a known convention that indicates the relative direction of electromotive force in the respective windings. According to the convention, if a current in the primary winding is in the direction from the dotted to the undotted end of the winding, thereby generating a back electromotive force in the direction from the undotted to the dotted end of the primary winding, then the electromotive force in each secondary winding of the transformer is also in the direction from the undotted to the dotted end of the winding, and vice versa for the opposite direction of primary current.

When forward current is started in a silicon controlled rectifier as by applying a gating pulse to the gate electrode, the device ordinarily conducts at first over a small junction area within the device, the area growing over a brief interval of time until the entire area of the junction is carrying current. To protect the rectifier SCR-2 from excessive power dissipation in a small junction area during this time interval, a saturable transformer 130 is provided. The transformer 130 has a protective winding 132 in series with the anode-cathode circuit of SCR-2 and a re-set winding 134 which latter is supplied with direct current from any suitable source, illustrated as a battery 136, through an inductor 138, and a rheostat 140. For the protection of the winding 134, that winding is shunted by a resistor 142 in series with a diode 144, the latter conductive in the direction to pass current from the battery 136.

The current from the battery 136 through the winding 134 normally maintains the transformer 130 saturated with respect to current in the direction from the undotted to the dotted end of each winding. When SCR-2 is gated, the capacitor 28 begins to discharge through the protective winding 132, thereby reducing the flux in the core of the transformer 130 progressively to zero and thereafter building up flux to saturation in the opposite polarity.

While the flux is changing, the current in the winding 132 is limited by the transformer action maintaining equal numbers of ampere-turns in the respective windings 132 and 134. The maixmum current in the winding 134 is the sum of the magnetizing current for the core and the current induced in the winding 134 by the changing primary current in winding 132 necessary to reduce the magnetomotive force in the core to zero. The maximum current in the winding 132 during the same period is the maximum current in the winding 134 times the turns ratio.

When saturation in the opposite polarity is reached, the current through SCR-2 is no longer limited by the winding 132, permitting sufficient current to enter the cathode of SCR-1 to back bias and block that rectifier.

The overall action of the winding 132 is thus to delay the turn off of SCR-1 until the core of 130 has saturated with respect to current in the direction from the dotted to the undotted end of the winding 132, permitting safe build-up of power at the conductive junction of SCR-2. When SCR-1 is turned off, the load current transfers from SCR-1 to SCR-2.

While maximum current is flowing through SCR-2, the magnetomotive force due to this current is opposed by that due to the battery current flowing through the winding 134. The former magnetomotive force, however, greatly exceeds the latter, so the net result is saturation of the core.

When SCR-2 is turned off, the magnetomotive force generated by the battery current remains and is effective to re-set the core in the above described normal condition of saturation for current in the direction from the undotted to the dotted end of either winding. To effect rapid re-setting, the circuit is preferably so designed as to draw more current from the battery than is required to magnetize the core. Any excess current is diverted through the resistor 142 and diode 144. A voltage rise across the winding 134 occurring at this time is limited by proper choice of the resistance of the resistor 142.

Figure 3:
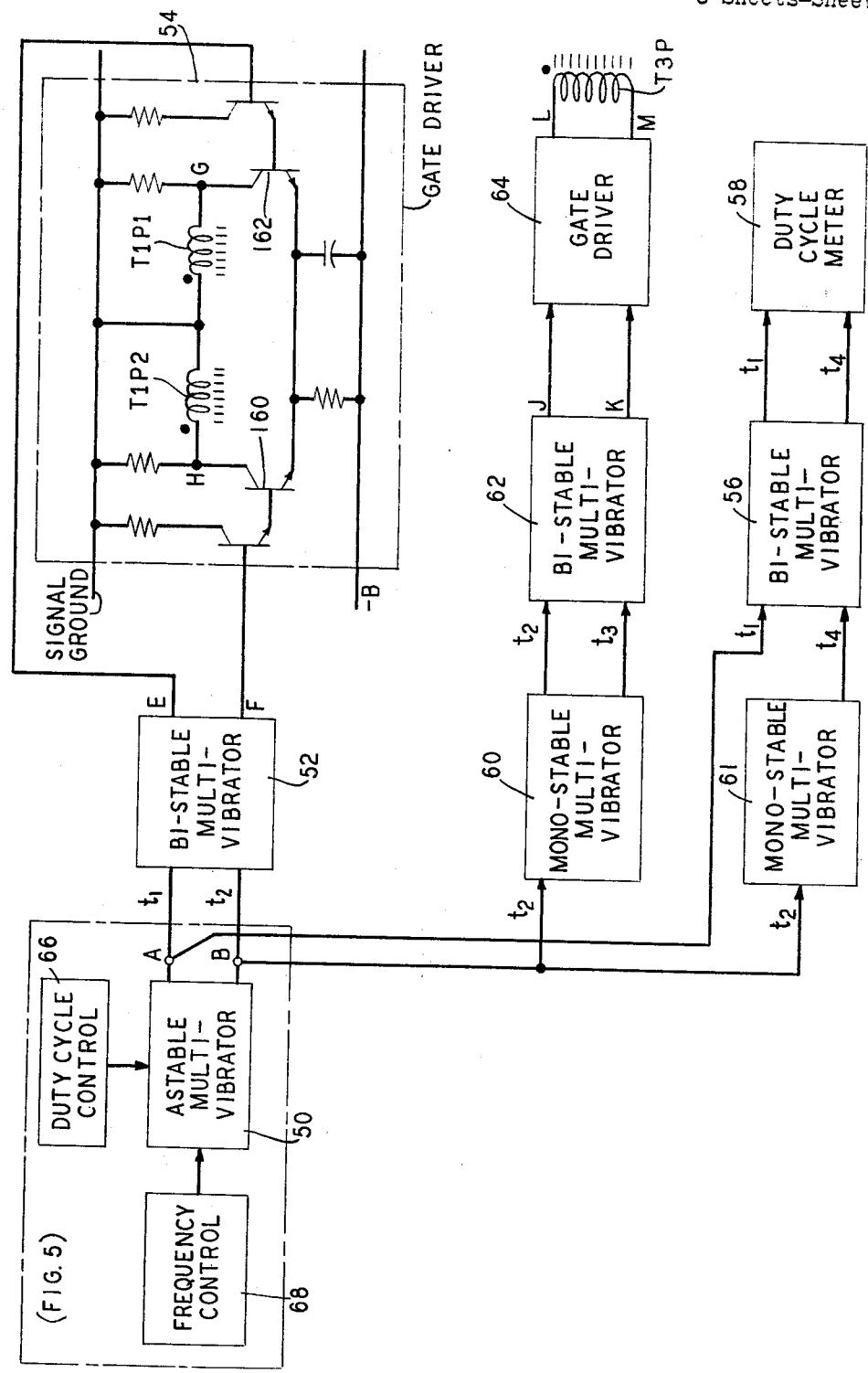
FIG. 3 is a block diagram of a timing and gating system designed to supply the gating pulses for the system shown in FIG. 1.

FIG. 3 is a block diagram of illustrative electronic devices for timing the sequence of the pulses required for operating the system shown in FIG. 1 and for supplying driving pulses to the gate electrodes of the several silicon controlled rectifiers.

An astable multivibrator 50 runs continuously as an oscillator at a predetermined frequency, producing two output pulses per cycle. One pulse in each cycle occurs at the instant designated $t_1$ in FIG. 2, initiating the turning on of SCR-1. This pulse appears at the output terminal marked A in FIG. 3 and is impressed upon one input terminal of a bi-stable multivibrator 52, as well as upon one input terminal of a bi-stable multivibrator 56. This places the device 52 in one of its two possible states and is so arranged as to actuate a gate driver 54, in such manner as to send current through the primary winding T1P1 in the direction from the dotted to the undotted end of the winding. The back electromotive force generated in the primary T1P1 generates an electromotive force in the secondary winding T1S1 coupled thereto, in the direction from the undotted to the dotted end of the winding T1S1, sending induced current into the gate electrode of SCR–1 turning on the rectifier.

The pulse delivered to the bi-stable multivibrator 56 places that device in one of its two possible states.

The second pulse in each cycle occurs at the instant designated $t_2$ in FIG. 2, initiating the turning on of SCR–2. This pulse appears at the output terminal marked B in FIG. 3 and is impressed upon a second input terminal of the device 52, transferring the latter device to the second of its two possible states. The gate driver 54 as a result sends a current through T1P2 in the direction from the undotted to the dotted end of the winding, generating an electromotive force in the secondary winding T1S2 from the dotted to the undotted end of the secondary winding, sending induced current into the gate electrode of SCR–2, thus turning on this rectifier.

The pulse from the oscillator 50 at terminal B and instant $t_2$ is also impressed substantially simultaneously upon the input terminals of a pair of mono-stable multivibrators 60 and 61, throwing each of these latter devices out of its stable state, to start a time interval after which the respective device returns to its stable state, measuring out a desired time interval. The intervals measured by devices 60 and 61 are different in length. The pulse upon device 60 is passed immediately also to a bi-stable multivibrator 62, placing the latter device in one of its two possible states, causing shifts in potential in opposite senses at output terminals J and K. This shift actuates a gated driver 64 causing the latter to send current through the primary winding T3P from the undotted to the dotted end thereof. A current is induced thereby in the secondary winding T3S from the dotted to the undotted end thereof, but this current is not in the right direction to fire SCR–3 which will be fired later as described below.

At the instant $t_3$, the device 60 sends a pulse into a second input terminal of the device 62, which in turn causes the potentials at the output terminals J and K to shift back to their original values, thereby again to actuate the gate driver 64. The latter, in this case, sends current through the primary winding T3P from the dotted to the undotted end of that winding, sending induced current from the undotted to the dotted end of the secondary winding T3S into the gate electrode of SCR–3, turning on that rectifier.

At the instant $t_4$, a pulse is passed from the monstable multivibrator 61 to a second input terminal of the bi-stable multivibrator 56, causing the latter to change state. A duty cycle meter 58 is actuated by multivibrator 56 to produce an indication which is proportional to the time interval from $t_1$ to $t_4$, thus giving a running visual indication of the value of the duty cycle.

The astable multivibrator 50 is provided with a duty cycle control device 66 and a frequency control device 68. The operator, observing the results of his work, can adjust either the frequency or the duty cycle or both, as required to obtain best results, being guided as to the duty cycle by the reading of the meter 58.

In order that the meter 58 may accurately indicate the magnitude of the duty cycle, the time interval measured by the mono-stable, multivibrator 61 should be adjusted to the value of that portion of one half-cycle of oscillation of the resonant circuit comprising the inductor 24, the capacitor 28 and other significant components executed beginning at instant $t_2$, so that the time interval from $t_2$ to $t_4$ will correspond closely with the time required for the capacitor 28 to make one complete reversal of charge.

The gate driver 54, detailed in FIG. 3, is illustrated as employing NPN-type transistors 160 and 162, driven by the multivibrator 52 which causes these transistors to become conductive one at a time. When transistor 160 is conducting, current flows through the saturable transformer primary winding T1P2 from the undotted to the dotted end of the winding, generating a negative-going pulse at point H and a positive-going pulse at point G. When transistor 162 is conducting current flows through the primary winding T1P1 from the dotted to the undotted end of the winding, generating a negative-going pulse at point G and a positive-going pulse at point H. The transformer comprising windings T1P1, T1P2, T1S1 and T1S2 works between saturation of the core in one direction and saturation of the core in the reverse direction.

The conducting transistor is used as a switch and is preferably provided with enough base current so that the transistor is capable of drawing more collector current than the transformer primary winding with its load will ever require. The transistor thus provides substantially a constant potential drive for the transformer at such times as the magnetic flux in the core of the transformer is changing. When the transformer core saturates, the collector current rises to its saturation value determined by its base current and maintains that current value constant, thus limiting the current in the transformer primary winding as saturation of the core continues.

Figure 4:
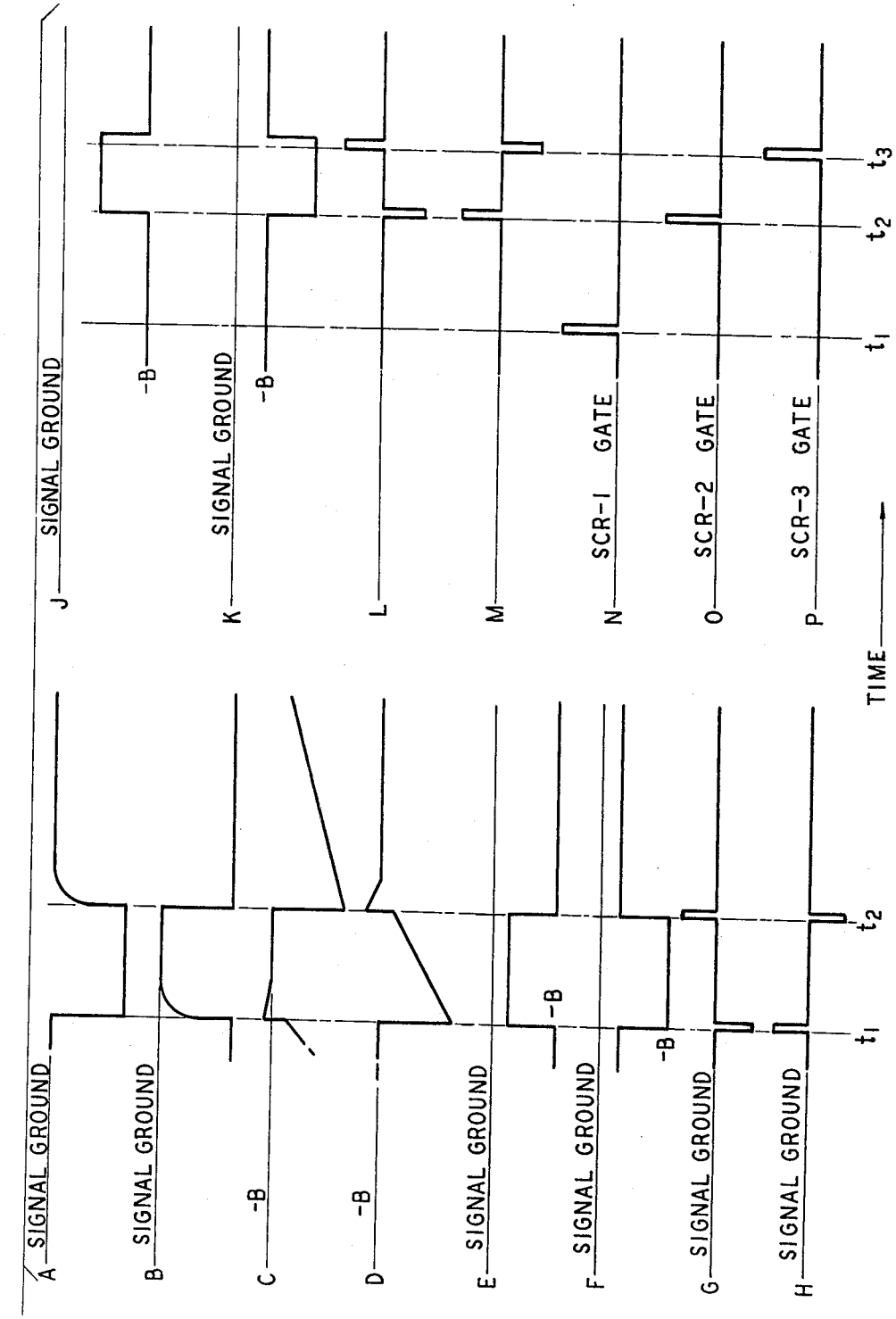
FIG. 4 is a set of graphs representing wave forms at designated points in the timing and gating system.

The description of the operation of the system shown in FIGS. 1 and 3 will now be continued with special reference to FIG. 4, which latter shows additional wave forms approximately as they have been observed by oscilloscope in studying the actual system previously mentioned.

The individual wave forms shown in FIG. 4 are referenced A through H and J through P to indicate the circuit point at which the respective wave form is observed, the points being marked in the figures of the drawing. The instants $t_1$, $t_2$, and $t_3$ are marked as abscissae for the graphs shown in FIG. 4 and the several wave forms are aligned vertically with respect to these abscissae. Ordinates for the respective graphs are voltages related to "—B" and "Signal Ground," potentials in the power supply for the timing and triggering circuits. The voltage of the positive terminal of the power supply is +B, the voltage of the negative terminal is —B, and the voltage of the Signal Ground terminal is intermediate in potential between +B and —B. In an embodiment that has been successfully operated, +B is about +5 volts, Signal Ground about zero volts, and —B about —15 volts.

In FIG. 4, graph A represents the voltage at one output terminal of the astable multivibrator 50. The voltage on this terminal marks the instant $t_1$ by a sudden drop in voltage, from Signal Ground potential. At instant $t_2$, the voltage returns substantially exponentially to Signal Ground potential.

Graph B represents the voltage at the other output terminal of the multivibrator 50, which marks the instant $t_2$, by a sudden drop in voltage from Signal Ground potential. At the corresponding instant $t_1$ in the succeeding cycle the voltage returns substantially exponentially to Signal Ground potential.

Graph C represents the voltage at one terminal of one of the timing capacitors within the multivibrator 50 (FIG. 5) and graph D the voltage at the corresponding terminal of the other timing capacitor within the multivibrator 50. The action of these capacitors will be described below in conjunction with the detailed schematic diagram of the multivibrator 50 shown in FIG. 5.

The application of the sudden drop in voltage at point

A at instant $t_1$ causes a sudden rise in voltage at point E in the output of the bi-stable multivibrator 52, from a voltage close to —B to a voltage somewhat below Signal Ground, as shown in graph E. At the same instant, the voltage at point F in the output of the bi-stable multivibrator 52 falls abruptly from the same higher voltage to approximately —B, as shown in graph F. At instant $t_2$, the application of the sudden drop in voltage at point B causes the multivibrator 52 to change state, dropping the voltage at point E and raising the voltage at point F.

During the brief intervals of change of state in the multivibrator 52, short pulses of current are induced in the transformer comprising the primary windings T1P1, T1P2 and the secondary windings T1S1, T1S2. The wave forms of these pulses are shown in graphs G and H relating the pulses to the points G and H at the output of gate driver 54.

In order to generate pulses of uniform duration or pulse width, it is preferable to use transformers that have saturable magnetic cores. In such a transformer, the pulse width is determined by the saturation time of the core. Accordingly, saturable transformers are shown at the outputs of the gate drivers 54 and 64.

At instant $t_2$, the multivibrator 60 causes a change of state in the bi-stable multivibrator 62, resulting in a sudden rise in voltage in the output of the device 62 at point J and a corresponding sudden drop in the voltage at point K. At instant $t_3$, device 60 resumes its stable state, causing device 62 to change state and resulting in a sudden drop in voltage at point J accompanied by a sudden rise in voltage at point K. The resulting wave forms are represented in graphs J and K.

Graphs L and M show the resulting pulses of voltage at the two ends of the primary winding T3P.

Graphs N, O, and P represent the gate pulses delivered to the rectifiers SCR–1, SCR–2, and SCR–3, respectively, comprising one pulse to each rectifier, occurring at the instants $t_1$, $t_2$, and $t_3$, respectively.

Figure 5:
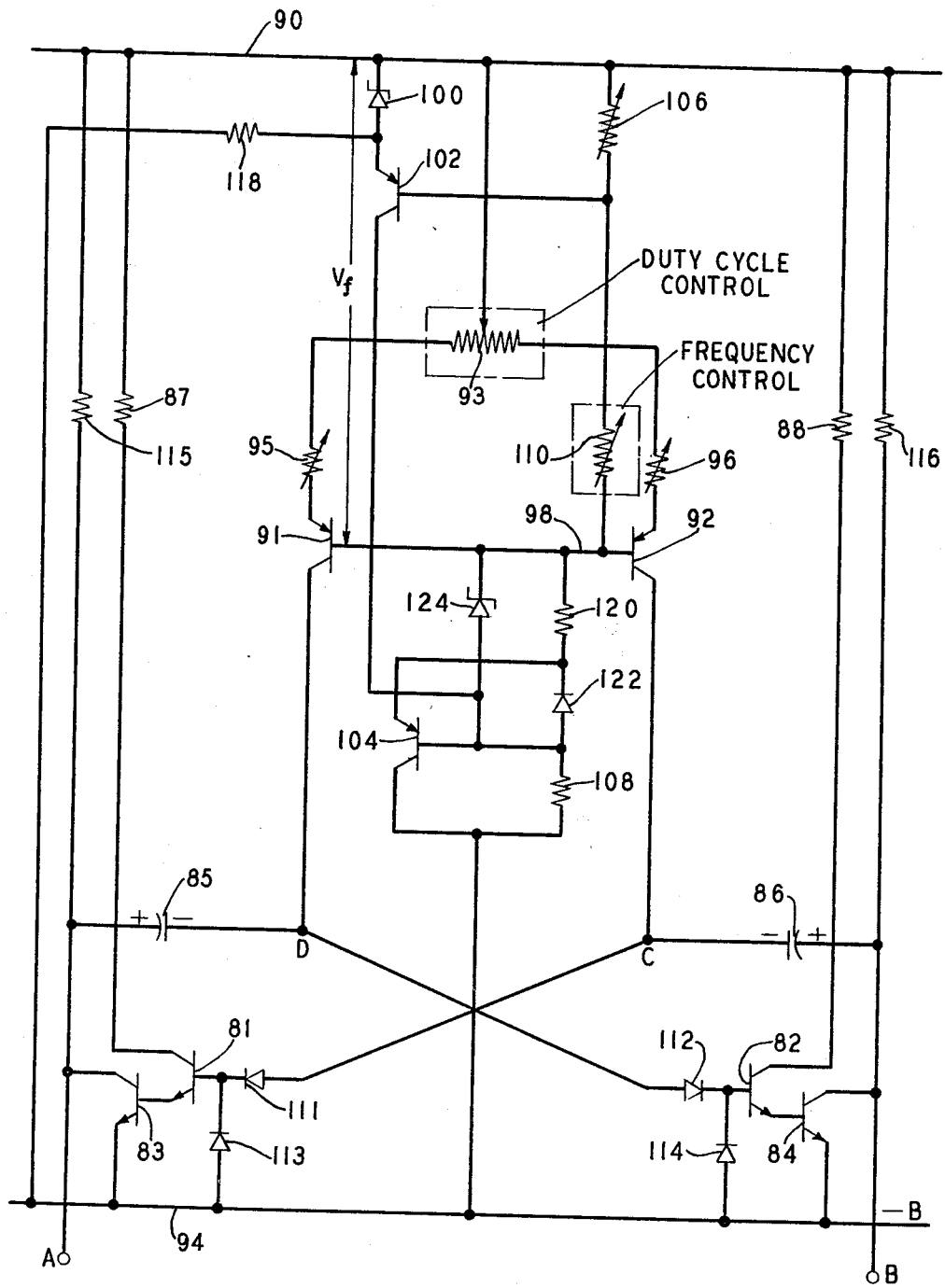
FIG. 5 is a detailed schematic diagram of an illustrative embodiment of an astable multivibrator shown in block form in FIG. 3.

FIG. 5 shows an illustrative astable solid state multivibrator circiut in schematic form incorporating improvements in accordance with the present invention. A train of NPN-type transistors 81, 83, on the lefthand side of the circuit, and a similar, preferably identical, train of NPN-type transistors 82, 84, on the righthand side, constitute the usual switchnig elements of the multivibrator. The timing capacitors are the capacitor 85, connected between the collector electrode of transistor 83 and the base electrode of transistor 82, and the capacitor 86, connected between the collector electrode of transistor 84 and the base electrode of transistor 81. A resistor 115, connected between Signal Ground 90 and the collector electrode of transistor 83, and a resistor 116, connected between Signal Ground 90 and the collector electrode of transistor 84, are provided in re-charging circuits for the capacitors 85 and 86, respectively. Collector load resistors 87 and 88 are provided for the transistors 81 and 82, respectively.

A substantially constant current source for sending a charge reducing current into the capacitors 85 and 86 comprises a pair of similar, preferably identical, PNP-type transistors 91 and 92. The potential for producing this current is developed between Signal Ground 90 and the —B power terminal 94.

The charge reducing current path for the capacitor 85 is from Signal Ground 90 through the lefthand side of a potentiometer 93, which latter constitutes the duty cycle device 66 appearing in FIG. 3. The path continues through a trimming resistor 95, the emitter-collector path of transistor 91, the capacitor 85, and the collector-emitter path of transistor 83 to the —B terminal 94.

The charge reducing current path for the capacitor 86 is from Signal Ground 90 through the righthand side of the potentiometer 93, a trimming resistor 96, the emitter-collector path of transistor 92, the capacitor 86, and the collector-emitter path of transistor 84 to the —B terminal 94.

It will be evident that NPN-type transistors may be substituted for PNP-type transistors 91 and 92, provided PNP-type transistors are then substituted for NPN-type transistors 81, 82, 83 and 84. Also, other suitable constant current source means may be used instead of the transistors 91 and 92, such as operational amplifiers, trains of transistors, etc. Furthermore, transistors 81 and 82 together with resistors 87 and 88 may be omitted and cross-connections from points C and D may be made directly to the base electrodes of transistors 83 and 84, respectively, without essential difference in the operation of the multivibrator.

Diodes are inserted in circiut for the protection of the transistors 81–84. The diode 111 is in the connection from the negative terminal of capacitor 86 to the base electrode of transistor 81 poled to conduct current in that direction. The diode 112 is in the connection and poled in the direction from the negative terminal of capacitor 85 to the base electrode of transistor 82. The diode 113 provides conduction from —B terminal 94 to the cathode of diode 111. The diode 114 provides conduction from —B terminal 94 to the cathode of diode 112.

The operation of the astable multivibrator of FIG. 5 will now be explained in more detail. In this explanation, the diodes 111, 112, 113, and 114 will not be taken into account. These diodes do not modify the essential operation of the multivibrator, which will operate with or without the diodes. The use of the diodes will be more fully explained hereinafter.

The following conditions will be assumed to exist at the start of a cycle of operation of the astable multivibrator shown in FIG. 5.

Capacitor 85 is having its charge reduced at a substantially uniform time rate by a substantially constant current flowing from Signal Ground 90 through the lefthand portion of potentiometer 93, resistor 95, transistor 91, and the collector-emitter path of transistor 83 to —B terminal 94.

Capacitor 86 is being recharged exponentially by current flowing from Signal Ground 90 through the resistor 116 into the positive terminal of capacitor 86 and out of the negative terminal, through the base-emitter path of transistor 81 and the base-emitter path of transistor 83 to —B terminal 94.

A second substantially constant current is flowing from Signal Ground 90 through the righthand portion of potentiometer 93, resistor 96, transistor 92, the base-emitter path of transistor 81 and the base-emitter path of transisor 83 to —B terminal 94.

Transistor 82, and consequently also transistor 84, is blocked by back bias from capacitor 85 connected with negative terminal to the base of transistor 82 and positive terminal to the emitter of transistor 84, blocking base-emitter current in either transistor.

Transistors 81 and 83 are conductive for reasons that will appear below.

The time constant determined by the capacitor 86 and the resistor 116 is so chosen that capacitor 86 becomes fully recharged before capacitor 85 discharges to a critical voltage, its lowest voltage, to be specified below, whatever the discharging rate set by adjustment of potentiometer 93.

A turning point in the operation occurs when the back bias on transistor 82 is overcome by a forward bias applied as the result of the constant tendency of current from transistor 91 to enter the base of transistor 82.

At this instant, transistors 82 and 84 become conductive, with the result that the current from transistor 91 switches abruptly to the base of transistor 82 and through transistors 82 and 84 to the —B terminal 94.

As a further result of conduction through transistors 82 and 84, the positive terminal of capacitor 86 is connected to —B terminal 94 through the collector-emitter path of transistor 84 and thence to the emitter of transistor 83, while the negative terminal of capacitor 86 is connected to the base of transistor 81, thus back biasing transistors 81 and 83.

As a result of transistors 81 and 83 being back biased and blocked, capacitor 85 now has its positive terminal connected through resistor 115 to Signal Ground 90 and its negative terminal through the low impedance base-emitter paths of transistors 82 and 84 to −B terminal 94.

Capacitor 85 now recharges through resistor 115 and the conductive transistors 82, 84, and capacitor 86 has its charge reduced at a substantially constant time rate by current through transistor 92 and the collector-emitter path of transistor 84.

It will be evident that the system shown in FIG. 5 has now completed a half cycle and has reverted to the starting condition that was assumed, except that the elements on the lefthand side are now in the assumed starting condition of the elements on the righthand side, and vice versa. Accordingly, the system is ready to begin a half cycle like that above described which will in turn bring the system back to the original starting condition, and the cycle repeats indefinitely. It is known that oscillations are self-starting upon application of power to the multivibrator.

The output signals from the multivibrator of FIG. 5 appear at the terminals A and B. When transistor 83 becomes conductive, which occurs suddenly, terminal A shifts abruptly from Signal Ground potential to substantially −B potential, giving a steep downwardly stepping wave form, as shown in graph A of FIG. 4, signaling the instant $t_1$. When transistor 83 is becoming blocked, at instant $t_2$, the process is not abrupt, since the back bias builds up exponentially as capacitor 86 shifts part of its charge out of the base of transistor 81 into the emitter of transistor 84. The voltage at A rises exponentially, from substantially −B potential to Signal Ground, as shown in graph A. The exponential rise need not be used to signal instant $t_2$ since a sharper signal is available at point B. At the latter point, there is an exponential rise at instant $t_1$ and an abrupt voltage drop at instant $t_2$, as shown by graph B of FIG. 4.

The duty cycle is controlled by adjusting the potentiometer 93. By means of this potentiometer, the ratio of the charge reducing currents in the respective capacitors is controlled. Because of the constant current characteristics at the collectors of transistors 91 and 92, when the potentiometer 93 is adjusted, the sum of the charge reducing times in the two capacitors remains substantially constant, provided a substantially constant voltage $V_f$ is maintained between Signal Ground 90 and the potential equalizing connector 98 that joins the base electrodes of the transistors 91 and 92.

The following is a mathematical demonstration to show that in the system of FIG. 5 the frequency and the duty cycle can be independently adjusted, provided the transistors 91 and 92 are well matched, that is, substantially identical in emitter-base voltage drop and in common emitter current gain; that the resistors 95 and 96 are adjusted to closely equal resistance values; and that the capacitors 85 and 86 are substantially identical in electrostatic capacity.

In this demonstration, the following notations will be used:

$V_f$ = Voltage between Signal Ground 90 and common base connection 98 of transistors 91 and 92.
$V_{BE}$ = Emitter-base voltage drop in transistor 91 or 92.
$R_A$ = Resistance of lefthand portion of potentiometer 93.
$R_B$ = Resistance of righthand portion of potentiometer 93.
$R_E$ = Resistance of resistor 95 or 96.
$k$ = Current amplification factor of transistor 91 or 92 based on equal common emitter gains in each.
C = Capacitance of capacitor 85 or 86.
E = Voltage change between fully charged and critically discharged condition of capacitor 85 or 86.
$I_3$ = Collector-emitter current in transistor 91.
$I_4$ = Collector-emitter current in transistor 92.
T = Period of one cycle.

The respective transistor currents are:

$I_3 = k(V_f - V_{BE})/(R_A + R_E)$
$I_4 = k(V_f - V_{BE})/(R_B + R_E)$

The total period of one cycle of oscillation is almost exactly the sum of the time required for $I_3$ to discharge capacitor 85 through voltage E, plus the time required for $I_4$ to discharge capacitor 86 through the same voltage, since these operations follow one another during the cycle.

Therefore:

$$T = CE/I_3 + CE/I_4$$
$$= (CE/k(V_f - V_{BE})) \times (R_A + R_E + R_B + R_E)$$
$$= K(f) \times (R_A + R_E + R_B + R_E)$$

where $K(f)$ varies only with $V_f$.

By definition, the duty cycle is $K(f) \times (R_A + R_E)$ divided by $K(f) \times (R_A + R_B + 2R_E)$, which reduces to (Duty Cycle = $(R_A + R_E)/(R_A + R_B + 2R_E)$)

showing that duty cycle is independent of frequency.

Furthermore, since the frequency depends only upon $K(f)$, which does not involve the resistors, frequency is independent of duty cycle.

The required constant voltage $V_f$ is maintained by means of a Zener diode 100 in conjunction with a pair of PNP-type transistors 102 and 104 together with a feedback resistor 106, another resistor 108, and a rheostat 110. By inclusion of the rheostat 110, the constant voltage $V_f$ is made adjustable and this rheostat constitutes the frequency control 68 shown in FIG. 3. The transistors 102 and 104, the resistors 106 and 108, and the rheostat 110 are so interconnected with the Zener diode 100 as to tie the desired constant voltage to the substantially constant voltage across the Zener diode, while allowing the constant voltage to be varied as desired. To further insure the required constancy of voltage, the power source from which the potentials +B, −B, and Signal Ground are derived is preferably a feedback regulated direct current source. In particular, the power source which controls the voltage at −B must be well regulated, in order to maintain sufficiently constant the voltage E defined above.

Zener diode 100 serves to maintain a highly constant voltage difference between the Signal Ground terminal 90 and the emitter electrode of the transistor 102. The transistors 102 and 104 cooperate to make the voltage across the feedback resistor 106 match the voltage across the Zener diode 100. For example, if the voltage across resistor 106 momentarily exceeds the matched value, the potential at the base electrode of transistor 102 drops, letting more current into the base electrode, thereby increasing the emitter-collector current through that transistor. The increased current from transistor 102 increases the voltage drop across resistor 108 and reduces the current into the base electrode of transistor 104, thereby reducing the current through transistor 104, and so reducing also the current through resistor 106 and lowering the voltage drop thereacross. Similarly, if the voltage across resistor 106 is momentarily less than the matched value, the transistors act to increase the current through resistor 106. Thus, the transistors 102 and 104 tend to maintain a constant voltage across resistor 106, so that, if the current through resistor 106 is varied by adjusting the frequency control rheostat 110, the voltage across the resistor 106 and the current through the resistor remain constant. Hence, because the current is held constant, the voltage across the rheostat 110 varies directly in proportion to the resistance value of the rheostat 110, giving a linear variation of the voltage across the rheostat. With a given setting of the rheostat 110, the voltage between terminals 90 and 98 remain constant, which latter voltage is the voltage $V_r$, the frequency determining voltage.

Resistor 118 is a bias resistor connecting the anode of the Zener diode 100 to —B potential to force the Zener diode to exceed its reverse current breakdown voltage and so permit the Zener diode to go into avalanche, thus maintaining a constant voltage across the Zener diode.

To limit the current through the emitter-collector path of the transistor 104, another Zener diode 124 and a resistor 120 are provided. These elements operate in conjunction with the resistor 108 in the following manner. Resistor 108 serves as a bias resistor for the Zener diode 124, enabling the latter to go into avalanche when required, to maintain a substantially constant voltage across the Zener diode. The Zener diode 124 is shunted by the series combination of the resistor 120 and the emitter-base path of transistor 104. Since the Zener diode voltage is constant, the greatest current that can flow through the resistor 120 and the transistor 104 occurs if the resistance of the emitter-base path of the transistor approaches zero, and this current cannot exceed the quotient of the Zener diode voltage divided by the resistance of the resistor 120.

The diode 122 serves to clamp the potential of the base of transistor 122 to the emitter thereof, to protect the transistor from excessive reverse base-emitter voltage.

The purpose and operation of the diodes 111–114 is as follows. During the portion of the cycle within which it is necessary to block the transistors 81 and 83, by means of back bias from capacitor 86, the positive terminal of capacitor 86 is connected through transistor 84 and diode 113 to the cathode of the diode 111, while the negative terminal of capacitor 86 is connected to the anode of the diode 111, thus back biasing the diode 111, blocking conduction through diode 111. The result is that no current can enter the base of transistor 81, thus blocking that transistor as effectively as if a back bias were applied directly to transistor 81. The blocking of transistor 81 prevents any current from entering the base of transistor 83, blocking that transistor. Diodes 112, and 114 act similarly to block transistors 82 and 84 during the appropriate portion of the cycle. Diode 113 serves further to clamp the potential of the base electrode of transistor 81 with reference to the potential of —B to protect transistor 81 from excessive reverse base-emitter voltage. Diode 114 similarly protects transistor 82.

While illustrative forms of apparatus and methods in accordance with the invention have been described and shown herein, it will be understood that numerous changes may be made without departing from the general principles and scope of the invention.

I claim:

1. In a switching system for supplying current in pulses from a direct current source to an inductive load, employing a gated rectifier of a type requiring a back bias upon the anode-cathode path thereof for blocking current therethrough, and employing a charged capacitor for supplying said back bias, the method of conserving the energy necessary to maintain a sufficient charge on said capacitor during cyclical operation of the system, which method comprises the steps of connecting the capacitor to the rectifier in such polarity as to supply said back bias to the rectifier, thereby blocking the rectifier, transferring the load current from the rectifier to the capacitor in the direction of current to discharge the capacitor, exciting a half cycle of oscillation in a first less than critically damped resonant circuit comprising the capacitor and the inductive load, thereby reversing the polarity of charge on the capacitor and adding stored energy of the inductive load to energy stored on the capacitor, transferring the reversely charged capacitor to a second less than critically damped resonant circuit comprising the capacitor, an inductor, and a resistor, and exciting a half cycle of oscillation in said second resonant circuit, thereby restoring the charge in the capacitor to its original polarity and voltage, any excess energy being dissipated in said resistor during said restoration of the original charge on the capacitor.

2. A switching system for supplying current in pulses from a direct current source to an inductive load, employing a gated rectifier of a type requiring a back bias upon the anode-cathode path thereof for blocking current therethrough, and employing a charged capacitor for supplying said back bias, said system comprising, in combination, means connecting the rectifier between the direct current source and the inductive load with the conductive direction of the rectifier from the positive terminal of the source toward the load, means for making and breaking a connection of the capacitor with the rectifier in such polarity as to supply said back bias to the rectifier, means including said last mentioned connection to excite a half cycle of oscillation in a first less than critically damped resonant circuit comprising the capacitor and the inductive load, thereby reversing the polarity of charge on the capacitor and adding stored energy of the inductive load to energy stored on the capacitor, said connection breaking means comprising said reversely charged capacitor; an inductor and a resistor, means for making and breaking a connection of said inductor and said resistor with said capacitor, means comprising said last mentioned connection to excite a half cycle of oscillation in a second less than critically damped circuit comprising the capacitor and said inductor and said resistor, thereby restoring the charge on the capacitor to its original polarity and voltage, any excess energy being dissipated in said resistor during said last mentioned half cycle of oscillation.

3. A pulsing system for supplying power from a direct current source to a load, comprising, in combination, first, second and third gated rectifiers of a type requiring a back bias upon the anode-cathode path thereof for blocking current therethrough, means to apply gate pulses to said rectifiers in the order named to render the same conductive in turn, said first rectifier being serially connected between the power source and the load with its conductive direction from the positive terminal of the source toward the load; a charged capacitor; first less than critically damped oscillatory circuit means including said capacitor and said second rectifier, whereby when said second rectifier is rendered conductive a back bias is applied to said first rectifier from said capacitor and thereafter the polarity of the charge on said capacitor is reversed, thereby applying a back bias to said second rectifier from said capacitor; second less than critically damped oscillatory circuit means including said capacitor and said third rectifier, whereby when said third rectifier is rendered conductive the charge on said capacitor is restored to its original polarity, thereby applying a forward bias to said second rectifier from said capacitor and a back bias to said third rectifier from said capacitor.

4. Apparatus in accordance with claim 3, in which said first oscillatory circuit comprises the source, the load, an inductor connected between the negative terminal of the source and one terminal of the load, together with the serial combination of said capacitor and said second rectifier in parallel with said first rectifier, the conductive direction of said second rectifier being toward the cathode of said first rectifier and the positive terminal of said capacitor as originally charged being connected to the anode of said second rectifier.

5. Apparatus in accordance with claim 3, in which said second oscillatory circuit comprises said capacitor together with an inductor, a resistor and said third rectifier serially connected to each other in a path in parallel with said capacitor, the conductive direction of said third rectifier being toward the anode of said second rectifier.

6. Apparatus in accordance with claim 3, together with a saturable reactor connected in series with the anode-cathode circuit of said second rectifier, said reactor being initially biased to delay current therethrough for the protection of said rectifier, whereby the initial current through said rectifier tends to reverse the magnetic flux in the core of said reactor, and means to re-set the polarity of flux in said core after each reversal.

7. Apparatus in accordance with claim 3, together with a keep-alive power supply for said load, and means to insure substantially constant current from said keep-alive power supply through the load.

8. Apparatus in accordance with claim 3, together with means to measure the time interval during which current flows from the source to the load, said time measuring means being started by a pulse coincident with the rendering of said first rectifier conductive and stopped by a pulse coincident with the cessation of current through the load.

9. Apparatus in accordance with claim 8, together with additional time measuring means which is started by a pulse coincident with the rendering of said second rectifier conductive and runs for a time interval adjusted to represent the time required for said capacitor to complete a reversal of charge through the power source and load, which additional time measuring means provides the pulse for stopping the first mentioned time measuring means.

10. The method of supplying pulses of power from a direct current source to a load, employing first and second less than critically damped oscillatory circuits in conjunction with an initially charged capacitor, and employing first, second and third gated rectifiers of a type requiring a back bias upon the anode-cathode path thereof for shutting off current therethrough, which method comprises the steps of employing said first rectifier to send current from the source through the load, employing said second rectifier and said first oscillatory circuit to apply a back bias to said first rectifier from said capacitor and to reverse the polarity of charge on said capacitor by sending current from said capacitor through said first oscillatory circuit, utilizing energy stored in said oscillatory circuit from said direct current source in conjuction with energy stored in said capacitor to assure a higher voltage across said capacitor after polarity reversal than before, employing said third rectifier and said second oscillatory circuit to restore the charge on said capacitor to its original polarity while dissipating excess energy in said second oscillatory circuit, and adjusting the impedance values in both said oscillatory circuits to return the voltage across the capacitor to its original value while minimizing the amount of energy required from the direct current source to maintain the desired voltage across the capacitor.

11. The method of supplying pulses of power from a direct current source to a load, employing first and second less than critically damped oscillatory circuits in conjunction with an initially charged capacitor and first, second and third gated rectifiers of a type requiring a back bias upon the anode-cathode path thereof for shutting off current therethrough, which method comprises the steps of rendering said first rectifier conductive, employing said conductive rectifier to send current from the source through the load; rendering said second rectifier conductive, employing said second conductive rectifier to apply a back bias from said charged capacitor to said first rectifier to shunt off current therethrough and switch said current into said capacitor to reverse and increase the charge thereon, thereby to apply a forward bias to said third rectifier, a back bias to said second rectifier, and to allow the source to apply a forward bias to said first rectifier, rendering said third rectifier conductive; employing said third conductive rectifier together with said second oscillatory circuit to restore said capacitor to its original magnitude and polarity of charge, to apply a back bias to said third rectifier and to apply a forward bias to said second rectifier, thereby restoring the system to its original state ready to repeat the cycle.

References Cited

UNITED STATES PATENTS 3,229,191    1/1966    Williamson.
3,278,827    10/1966    Corey et al.

OTHER REFERENCES

Menard, E. A. and Cielo, J. R.—"Switch Voltage Regulator," IBM Technical Disclosure Bulletin, vol. 6, No. 8, January 1964, pp. 31–2.

ROBERT K. SCHAEFER, Primary Examiner

T. B. JOIKE, Assistant Examiner

U.S. Cl. X.R.

219—501; 307—246, 252